Feb. 11, 1958  L. P. BARKER, JR  2,822,546
SUSPENSION DEVICE FOR HELMETS
Filed Aug. 2, 1954  3 Sheets-Sheet 1

INVENTOR.
LUTHER PAUL BARKER JR.
BY
Lyon & Lyon
ATTORNEYS

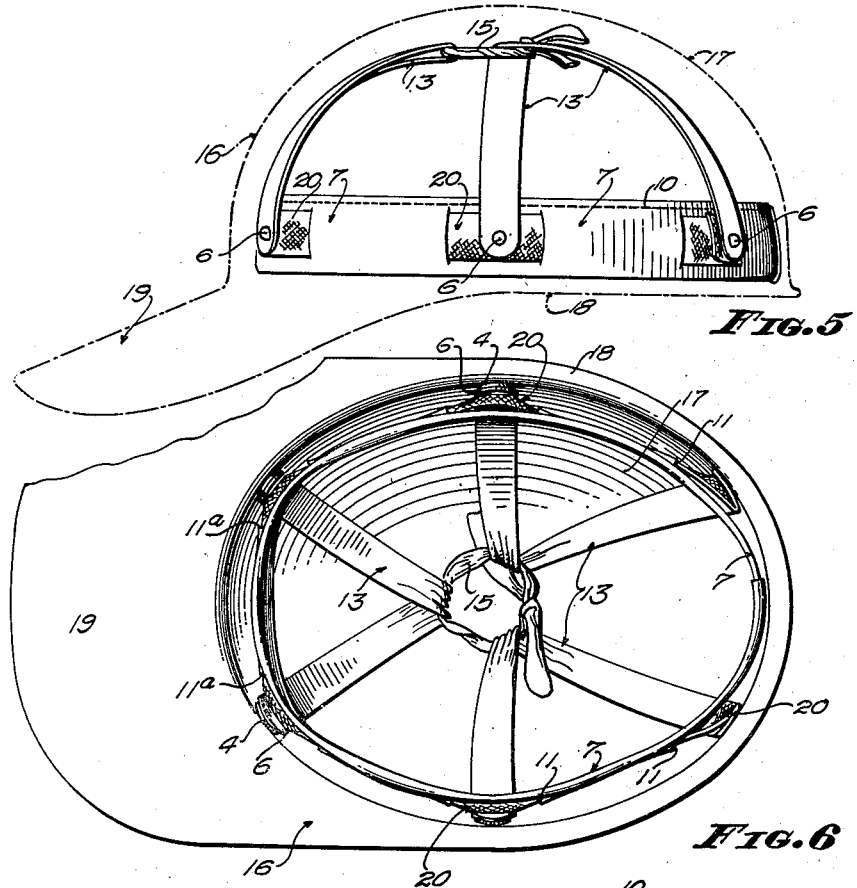
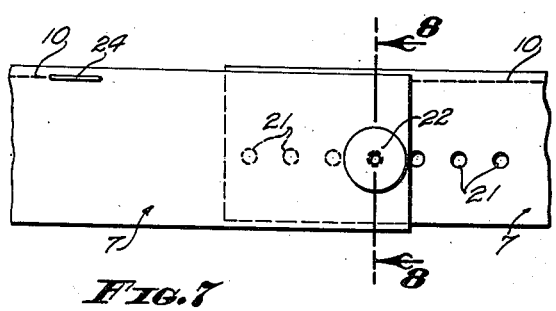
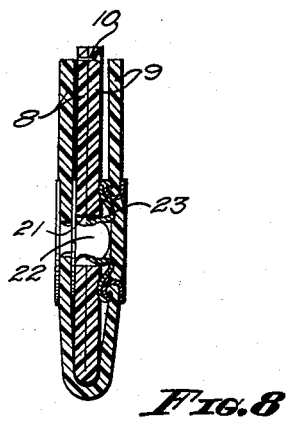

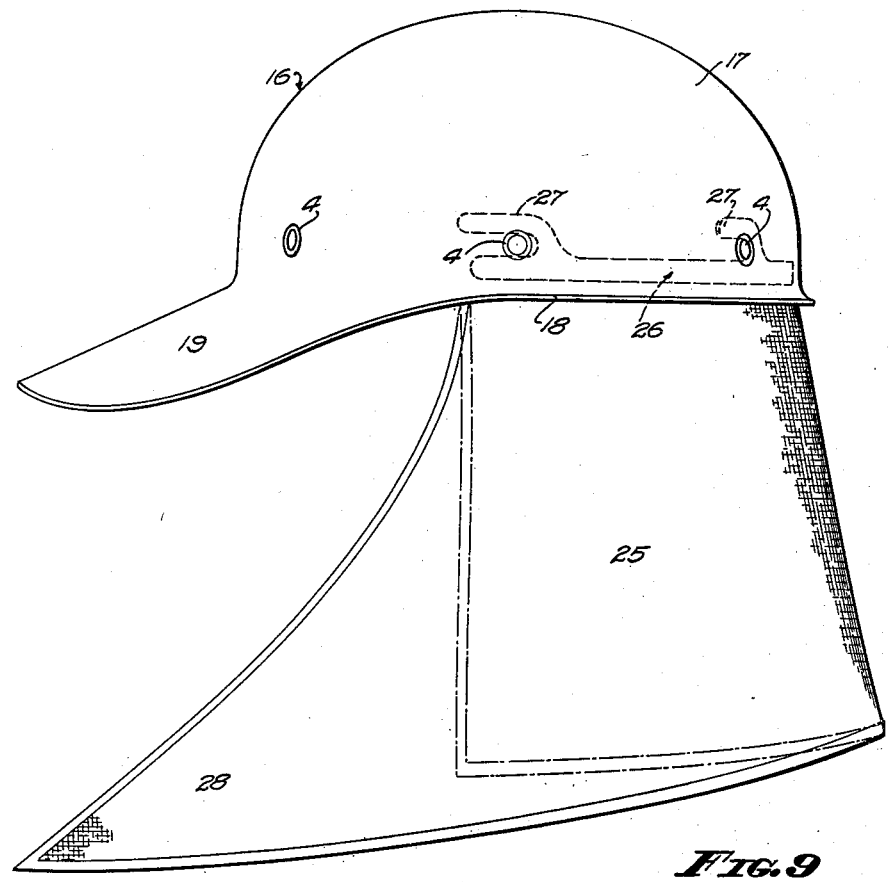
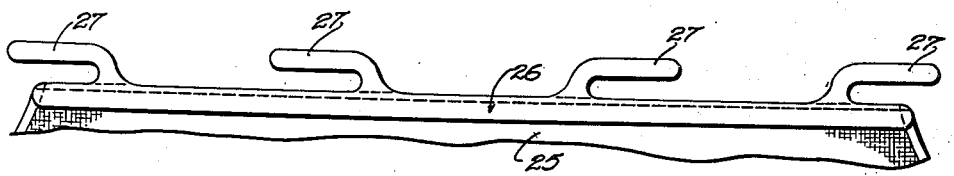

United States Patent Office 2,822,546
Patented Feb. 11, 1958

2,822,546

SUSPENSION DEVICE FOR HELMETS

Luther Paul Barker, Jr., Pacific Palisades, Calif.

Application August 2, 1954, Serial No. 447,099

3 Claims. (Cl. 2—3)

My invention relates to suspension device for helmets, and included in the objects of my invention are:

First, to provide a suspension device for helmets which may be readily installed or removed, and readily adjusted to various head sizes.

Second, to provide a suspension device which is light in weight and economical of manufacture and designed for use in light weight helmets, not intended primarily to function as safety helmets, or helmets designed to protect the wearer from head blows.

Third, to provide a suspension device for helmets which incorporates a simple and effective means for adjusting the headband size.

Fourth, to provide in a suspension device for helmets a simple cradle-strap construction.

Fifth, to provide in a suspension device for helmets a novel neck-protecting cape and means of attachment to the suspension device which permits ready attachment or separation of the cape.

With the above and other objects in view, as may appear hereinafter, reference is directed to the accompanying drawings, in which:

Fig. 5 is a side view of a modified form of my suspension device with the surrounding helmet shown in phantom outline;

Fig. 6 is a bottom view of a helmet with my modified suspension device shown therein;

Fig. 7 is a fragmentary elevational view of the sweatband, showing the manner in which the ends are adjustably connected;

Fig. 8 is an enlarged transverse sectional view through 8—8 of Fig. 7;

Fig. 8a is a transverse sectional view of a modified headband;

Fig. 9 is a side view of a helmet, illustrating by dotted lines the manner in which a cape may be added thereto; and Fig. 10 is a fragmentary developed view of the cape and its attaching means.

Figure 1:
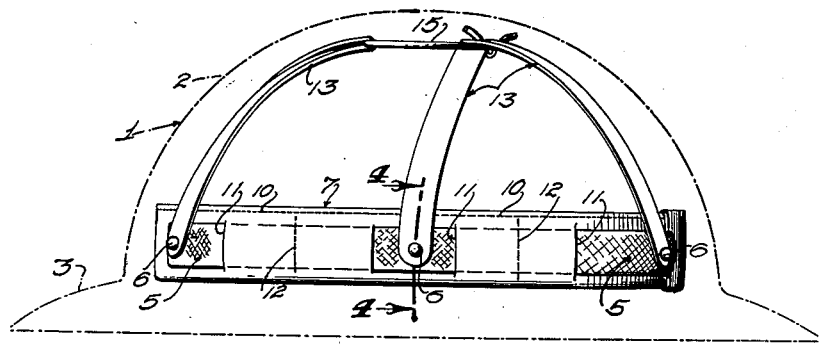
Figure 1 is a side view of my suspension device with the surrounding helmet shown in phantom outline.
Figure 2:
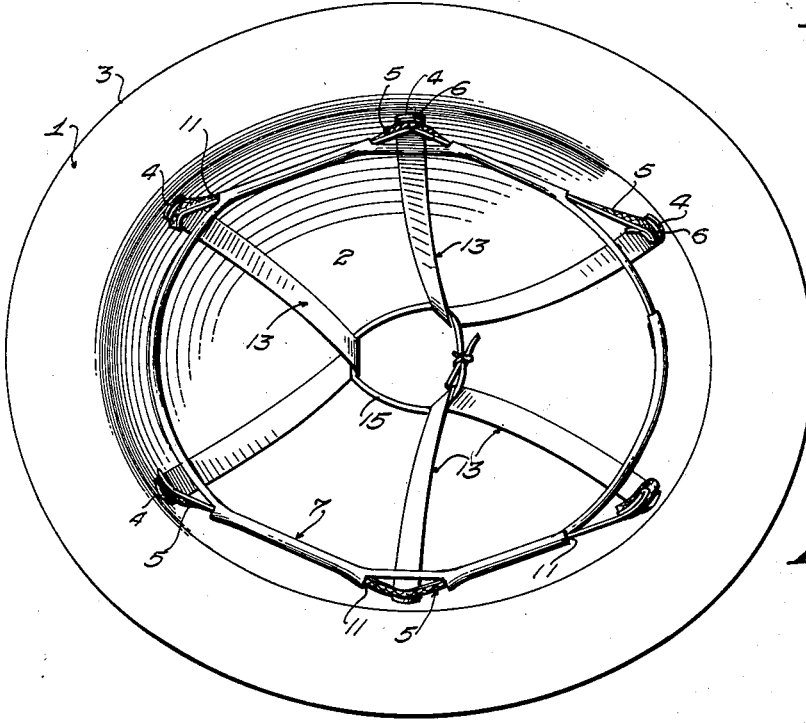
Fig. 2 is a bottom view of a helmet with my suspension device mounted therein.
Figure 3:
Fig. 3 is a developed view of one of the cradle straps.
Figure 4:
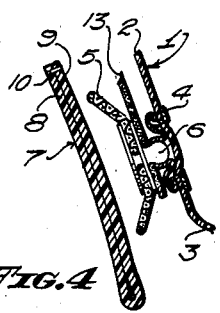
Fig. 4 is an enlarged fragmentary sectional view through 4—4 of Fig. 1, showing the manner in which the supporting strap and cradle strap are secured to the helmet.

Reference is first directed to Figures 1 through 4.

The suspension device is shown in connection with a helmet 1 having a crown 2 and a continuous brim 3. Secured to the crown 2, just above the brim 3, is a series of snap fastener elements 4. In this case six such elements are shown, substantially equally spaced.

A pair of elastic supporting straps 5 is provided. Each supporting strap is provided with a snap fastener member 6 at each extremity and its mid portion so that each supporting strap may be connected to three of the snap fastener elements 4 by means of the snap fastener members 6. The snap fastener elements and their mating members may be conventional.

A sweatband 7 is provided which is formed of leather or plastic material and is folded lengthwise to form a radially inner ply 8 and a radially outer ply 9 when the sweatband is curved into loop form. The folded margin of the sweatband is directed downwardly and the opposite or free margins are stitched together, as indicated by 10. Alternatively, as shown in Fig. 8a, the sweatband may be formed of an extruded flat tube 7a. In either case the outer ply of the sweatband is provided with pairs of slits or openings 11 so located as to permits the portions of the elastic supporting straps 5 between their snap fastener members 6 to be threaded through the loop formed between each pair of slits. If desired, the sweatband may be secured to the elastic supporting straps by transverse stitching or staples 12 located midway between the snap fastener members 6, so as to provide a firm method of locating centrally and equally of the band in relation to the shell.

Three cradle straps 13 are provided. Each cradle strap may be a single ply plastic or fabric member with a perforation 14 at each end. Each cradle strap is folded at its mid portion and its perforated ends are interposed between adjacent pairs of snap fastener elements 4 and snap fastener members 6. The folded mid portions of the cradle straps 13 are joined together by a tie loop 15.

The elastic supporting straps 5 are normally shorter than the distance between the snap fastener elements 4 which they connect, so that the supporting straps are under tension and tend to hold the sweatband 7 in spaced relation to the helmet 1.

As will be brought out hereinafter, the sweatband 7 is capable of adjustment for different head sizes by increasing or decreasing its circumference. In so doing the elastic properties of the supporting straps 5 enables the side portions of the sweatband to shift circumferentially so as to permit such adjustment. In addition, if the transverse stitching 12 is omitted the sweatband may slide on the supporting straps.

Reference is now directed to Figures 5 and 6.

In this construction a modified helmet 16 is shown which is provided with a crown 17, a rudimentary brim 18, and a visor 19. In place of the pair of elastic supporting straps 5 a single elastic strap 20 is employed. This strap is provided with snap fastener members 6 and extends from one of the rear snap fastener elements 4, around one side, the forward end, and the other side of the crown to the other of the rear pair of snap fastener elements.

The sweatband 7 herein employed is identical to the construction shown in Figures 1 through 4 with the exception that an additional pair of slits 11a are provided at the forward or mid portion of the sweatband.

In both arrangements shown in Figures 1 through 4 and in Figures 5 and 6, one extremity of the sweatband 7 is provided with a row of perforations 21 and is adapted to be inserted between the plies of the other extremity of the sweatband, as shown best in Figures 7 and 8. The plies of the other extremity are provided with cooperating snap fastener devices 22 and 23, similar to the snap fastener element 4 and the mating snap fastener members 6. The snap fastener devices 22 and 23 are adapted to be joined together through a selected perforation 21 so as to determine the size of the headband. The stitching 10 terminates short of the enveloping end of the sweatband and is held from raveling by a staple 24. In the case of the tubular sweatband 7a, the end carrying the snap fastener devices 22 and 23 is slit longitudinally and the staple 24 used to prevent further splitting.

Reference is now directed to Figures 9 and 10.

It is many times desirable, in the use of helmets 1 or 16, that a cape be provided to protect the neck of the wearer. My suspension device, and particularly its mode of attachment to the helmet, provides means uniquely suited to the support of a removable cape. Thus, in Figures 9 and 10 a cape 25 is shown formed of a fabric material. Secured to one margin of the cape is an attachment strip 26, preferably formed of semiflexible plastic material which forms a continuous, uniform support for the attached cape. This strip is adapted to underlie the rear and side snap fastener elements 4 and corresponding snap fastener members 6.

Extending in parallelism with the attachment strip 26 is a plurality of tongues 27. The tongues on either side of the mid portion of the attachment strip are directed toward the extremities thereof. In the construction illustrated, four such tongues are provided so as to engage the rear pair and side pair of snap fastener elements 4 and their snap fastener members 6. The slots formed by the tongues 27 and adjacent portions of the attachment strip 26 are sufficiently wide as to embrace the snap fastener elements and their members after the supporting straps 5, or strap 20, are secured in place. The attachment strip 26 is inserted from the rear of the helmet by guiding the respective tongues over the corresponding snap fasteners elements and members, as indicated by dotted lines in Figure 9. Removal is effected by pulling downwardly and rearwardly at the mid portion of the attachment strip.

As shown in Figure 9, the cape 25 may be provided with forwardly directed tabs 28 which may be tied together under the chin of the wearer. Alternatively, the tabs may be omitted as indicated by broken lines in Figure 9.

It will be observed that the cradle and the sweatband are separable and may be purchased and cleaned or replaced separately.

Having fully described my invention, it is to be understood that I do not wish to be limited to the details herein set forth, but my invention is of the full scope of the appended claims.

I claim:

1. A helmet structure, comprising: a helmet member having a crown; a plurality of snap fastener elements arranged in spaced relation within the crown; a suspension means including a sweatband and means having snap fastener members for attachment to said snap fastener elements thereby to dispose said sweatband in spaced relation to said crown; a cape attachment member, including a flexible strip having a plurality of spaced offset tongues extending parallel therewith to form horizontal recesses, the tongues and recesses at either side of the mid portion of said strip being directed toward the extremity of said strip, said strip being disposed under a series of said snap fastener elements and their attached snap fastener members with said tongues extending thereover; and a cape continuously secured by a margin thereof to said strip.

2. The combination with a helmet having a crown, a brim, and a plurality of spaced snap fastener elements disposed therein adjacent the brim thereof, of a suspension device, comprising: an elastic supporting strap, a plurality of snap fastener members secured to said strap and removably attachable to said snap fastener elements to secure said strap at spaced points within said crown, said fastener members being so positioned on said elastic strap as to place the intervening portions of said strap under tension when said fastener members are joined to said fastener elements; a two-ply sweatband adapted when looped into a band to form a radially inner and a radially outer ply, said outer ply having spaced transverse openings through which said strap is threaded to dispose said sweatband in yieldable spaced relation to said crown, one extremity of said band adapted to be inserted between the plies of the other extremity of said band, and provided with a row of perforations; snap fastener devices carried by the other extremity of said band and adapted to be joined together through a selected perforation; cradle straps, each strap having a perforated end interposed between said snap fastener elements and members; means connecting said cradle straps intermediate their ends to form a cradle; a flexible strip having a plurality of tongues offset upwardly and extending parallel to said strip, the tongues at either side of the mid portion of said strip being directed toward the extremities thereof, said strip being disposed with its mid portion between a pair of said snap fastener elements at the rear of said helmet crown with its extremities extending along the sides of said crown, said tongues being hooked over said snap fastener elements and their corresponding snap fastener members to support said strip between said sweatband and helmet crown; and a cape continuously secured by one margin thereof to said strip.

3. A cape attachment member for helmet structures wherein a suspension cradle is attached by a fastening means to the surrounding crown of a helmet at a plurality of spaced points, the combination of: a flexible strip disposed within said crown and extending around the back and along the sides thereof immediately below said fastener means; a plurality of tongues offset upwardly and extending parallel to said strip to overlie said fastener means and secure said strip in place thereunder; and a neck-covering cape member attached by one margin to said strip.

References Cited in the file of this patent

UNITED STATES PATENTS

| | | |
|---|---|---|
| 1,364,662 | Wagner | Jan. 4, 1921 |
| 1,492,577 | Obermeyer | May 6, 1924 |
| 2,136,678 | Dym | Nov. 15, 1938 |
| 2,371,712 | Scholl et al. | Mar. 20, 1945 |
| 2,415,214 | Lewis | Feb. 4, 1947 |
| 2,639,428 | MacLean | May 26, 1953 |

FOREIGN PATENTS

| | | |
|---|---|---|
| 1,027,877 | France | Feb. 18, 1953 |